United States Patent [19]

Dodge et al.

[11] Patent Number: 4,605,508

[45] Date of Patent: Aug. 12, 1986

[54] RAPIDLY DISSOLVING GRANULAR HYDRATED CALCIUM HYPOCHLORITE

[75] Inventors: David C. Dodge, Guilford; David F. Knoop, Bethany, both of Conn.; George T. Thomas, Martinez, Ga.; James P. Newman, Cleveland, Tenn.

[73] Assignee: Olin Corporation, Cheshire, Conn.

[21] Appl. No.: 667,174

[22] Filed: Nov. 1, 1984

[51] Int. Cl.$^4$ .............................................. C11D 3/395
[52] U.S. Cl. ................................. 252/95; 252/186.28; 423/474
[58] Field of Search ........................... 252/95, 187.28; 423/474

[56] References Cited

U.S. PATENT DOCUMENTS

| | | | |
|---|---|---|---|
| 2,693,454 | 11/1954 | Soule | 252/187 |
| 2,959,554 | 11/1960 | Robson | 252/99 |
| 3,584,996 | 3/1969 | Hughes | 423/474 |
| 3,639,284 | 2/1972 | Long et al. | 252/99 |
| 3,950,499 | 4/1976 | Miyashin et al. | 423/474 |
| 4,048,351 | 9/1977 | Saeman et al. | 423/474 |
| 4,053,429 | 10/1977 | Tatara et al. | 252/187.28 |
| 4,145,306 | 3/1979 | Tatara et al. | 252/187.28 |
| 4,183,907 | 1/1980 | Lynch et al. | 423/474 |
| 4,201,756 | 5/1980 | Saeman et al. | 423/474 |
| 4,276,349 | 6/1981 | Saeman | 423/474 |

*Primary Examiner*—Paul Lieberman
*Assistant Examiner*—Willie J. Thompson
*Attorney, Agent, or Firm*—James B. Haglind; Thomas P. O'Day

[57] ABSTRACT

A rapidly dissolving granular hydrated calcium hypochlorite product is comprised of hydrated calcium hypochlorite particles having at least 95 percent of the particles within a size range of from about 300 to about 850 microns. The product has a packed bulk density of less than about 1.05 grams per cubic centimeter. When dispersed on the surface of a body of water, such as a swimming pool, at least 3 feet deep, about 70 weight percent or higher of the particles dissolve within one minute.

5 Claims, No Drawings

RAPIDLY DISSOLVING GRANULAR HYDRATED CALCIUM HYPOCHLORITE

This invention relates to calcium hypochlorite products used in sanitizing applications. More specifically, this invention relates to rapidly dissolving particles of hydrated calcium hypochlorite.

The use of calcium hypochlorite product in the sanitizing and disinfection of water bodies is well known. Commercially employed granular hydrated calcium hypochlorite particles of the prior art, when dispersed in water, for example, by casting or sprinkling the granular particles on the surface of a swimming pool, dissolve somewhat slowly and, in addition, leave undissolved particles as a residue on the bottom of the pool. This residue was found to be undissolved product which, in addition to being unsightly, as it dissolves raises the pH in the dissolution zone and can result in promoting the precipitation of calcium carbonate, $CaCO_3$. Insoluble $CaCO_3$ particles require removal, for example, by vacuuming the pool or by the filter system.

Among the properties which affect the solubility of calcium hypochlorite in water are the particle size. It has been generally recognized that the particle size range is an important factor in the dissolving rate for calcium hypochlorite. For example, U.S. Pat. No. 2,693,454, published Nov. 2, 1954, by E. C. Soule teaches that quick dissolving, quick acting and non-sludging bleach mixtures are obtained using, as one ingredient, anhydrous calcium hypochlorite having an available chlorine concentration upwards of 60 percent and a water content not over about 2 percent in a semi-granular form. The particles should pass a 30 mesh screen and remain as a 60 mesh screen and not contain more than about 20 percent of fines which pass a 100 mesh screen.

H. L. Robson, in U.S. Pat. No. 2,959,554, Nov. 8, 1960 describes bleach solutions containing anhydrous calcium hypochlorite having an available chlorine content of 70 to 76 percent in granular form which passes through a 30 mesh and is retained on a 70 mesh screen, with the weight percent passing a 100 mesh screen should not exceed 10 to 12 percent and the weight coarser than 30 mesh should be less than 5 percent.

The screen analyses for anhydrous calcium hypochlorite containing about 70 percent available chlorine employed in the bleaching compositions of A. Long et al in U.S. Pat. No. 3,639,284 is as follows:

| Screen | Granular |
| --- | --- |
| On 16 mesh | 8 |
| On 20 mesh | 35 |
| On 30 mesh | 33 |
| On 40 mesh | 16 |
| On 50 mesh | 5 |
| On 70 mesh | 1.3 |
| On 100 mesh | — |
| Through 70 mesh | 1.7 |
| Through 100 mesh | — |
| Total | 100.0 |

The bulk density of the commercial anhydrous calcium hypochlorite granules employed by Long et al had a minimum (loose packed) density of about 0.79 and a maximum (shaken) density of about 0.83.

Hydrated calcium hypochlorite particles may be produced by known processes such as those described in U.S. Pat. No. 3,544,267 issued on Dec. 1, 1970, to G. R. Dychdala or U.S. Pat. No. 3,669,894 issued on June 13, 1972, to J. P. Faust.

Particles of solid, hydrated calcium hypochlorite products produced by commercial processes contain from about 55 to about 75 percent and preferably from about 65 to about 72 percent by weight of calcium hypochlorite $Ca(OCl)_2$, and from about 4 to about 10 percent and preferably from about 5 to about 8 percent by weight of water, the balance being inert materials usually resulting from the process of manufacture, e.g. sodium chloride, calcium hydroxide, calcium chloride and calcium carbonate.

The hydrated calcium hypochlorite particles produced in any commercial process are then separated to provide particles having a selected size range. Any suitable separation method may be used including, for example, screening and air classification. In the separation process, the oversized particles are reduced in size, for example, by crushing, and the undersized particles are compacted. Both the crushed particles and the compacted particles are fed back through the separation apparatus along with additional particles of hydrated $Ca(OCl)_2$ from the commercial process.

The dissolving rate of the above calcium hypochlorite compositions, however, is not sufficiently fast when dispersed on the surface of a water body such as a swimming pool to prevent the accumulation of undissolved materials on the bottom.

It is an object of the present invention to provide a granular hydrated calcium hypochlorite which dissolves rapidly in water and, when dissolved, leaves reduced amounts of undissolved material.

This and other objects of the invention are accomplished by a rapidly dissolving granular hydrated calcium hypochlorite product comprised of hydrated calcium hypochlorite particles having at least 95 percent of said particles within a size range of from about 300 to about 850 microns.

More in detail, the novel granular product of the present invention is comprised of hydrated calcium hypochlorite particles having a selected particle size range which rapidly dissolve when dispersed in a swimming pool and substantially reduce the amount of undissolved product on the bottom of the pool. The product is obtained by the separation of commercially produced hydrated calcium hypochlorite on at least two screens. The first screen retains particles greater than about 850 microns and passes particles equal to or smaller than about 850, preferably smaller than 800 microns. The larger particles are fed to a crushing device and the size reduced. Hydrated calcium hypochlorite particles 850 microns or less in size are passed to a second screen which retains particles larger than about 300, preferably larger than about 350 microns. Suitably, the particle size range for the granular hydrated calcium hypochlorite product of the present invention has at least 95%, preferably at least 97%, and more preferably at least 98% of the particles within the size range of from about 300 to about 850 microns. The selection of this particle size range for hydrated calcium hypochlorite surprisingly results in a reduced quantity of undersized particles and a subsequent reduction of the amount of hydrated calcium hypochlorite which must be compacted. Lowering the amount of compacted hydrated calcium hypochlorite particles results in a faster dissolving product. The presence of compacted material is reflected by an increase in the packed bulk density. Suitably the packed bulk density of the product of the present invention is less than about 1.05, for example from about 0.90 to about 1.03, and preferably from about 0.95 to about 1.02 grams per cubic centimeter as determined by the method of paragraph 4.3.7 in Federal Specification 0-C-114 B, Amendment-2, Mar. 9, 1977 entitled Calcium Hypochlorite, Technical. When added to a body of water such as a swimming pool, the novel granular hydrated calcium hypochlorite product of the present invention dissolves rapidly and results in a substantial reduction in the amount of undissolved product which reaches the bottom of the pool. For example, when the product of the present invention is dispersed on the surface of a water body at least 3 feet deep, at least about 70 and preferably about 72 percent by weight of the particles dissolve within one minute.

through the water for a period of one minute. At the end of this period, any undissolved particles were removed from the bottom of the tank. A pump was operated for five minutes to provide a homogeneous solution. The available chlorine concentration of this solution was then determined and the percentage of the product dissolved was calculated. For each example, this procedure was repeated daily for one month. The average percent of improved hydrated $Ca(OCl)_2$ particles dissolved is given in Table I below.

COMPARATIVE EXAMPLES A, B, C, and D

Commercial granular hydrated calcium hypochlorite particles were produced during the same time periods as those of Examples 1-4 having the following average compositions and sieve analysis:

|  |  | Comparative Example A | Comparative Example B | Comparative Example C | Comparative Example D |
|---|---|---|---|---|---|
| Average $Ca(OCl)_2$ Composition |  |  |  |  |  |
| % $Ca(OCl)_2$ |  | 69.57 | 69.18 | 68.94 | 68.61 |
| Total Alkali |  | 3.51 | 3.36 | 3.38 | 3.64 |
| % $CaCl_2$ |  | 0.50 | 0.59 | 0.57 | 0.83 |
| % NaCl |  | 16.51 | 16.38 | 15.87 | 16.53 |
| % $Ca(ClO_3)_2$ |  | 1.33 | 1.13 | 1.28 | 1.38 |
| % $CaCO_3$ |  | 2.31 | 1.93 | 2.36 | 2.43 |
| Packed bulk Density (g/cc) |  | 1.08 | 1.08 | 1.06 | 1.08 |
| % Screen Analysis |  |  |  |  |  |
| Mesh | Microns |  |  |  |  |
| +20 | >850 | 61.42 | 63.95 | 65.88 | 62.20 |
| −20 to +50 | 850 to 300 | 37.02 | 34.57 | 33.20 | 39.45 |
| −50 | <300 | 1.34 | 1.53 | 0.98 | 1.33 |

The novel product of the present invention is further illustrated by the following examples. All parts and percentages are by weight unless otherwise specified.

EXAMPLES 1-4

Granular hydrated calcium hypochlorite particles having reduced amounts of compacted material were passed through a controlled screening process. The hydrated calcium hypochlorite products recovered had the following composition and particle size range, each example represents the average product produced daily for the period of one month.

|  |  | Example 1 | Example 2 | Example 3 | Example 4 |
|---|---|---|---|---|---|
| Average $Ca(OCl)_2$ Composition |  |  |  |  |  |
| % $Ca(OCl)_2$ |  | 70.33 | 69.70 | 69.64 | 69.09 |
| Total Alkali |  | 3.59 | 3.36 | 3.41 | 3.60 |
| % $CaCl_2$ |  | 0.43 | 0.84 | 0.70 | 0.89 |
| % NaCl |  | 16.75 | 16.58 | 15.66 | 16.65 |
| % $Ca(ClO_3)_2$ |  | 1.34 | 1.13 | 1.25 | 1.35 |
| % $CaCO_3$ |  | 2.39 | 1.93 | 2.34 | 2.42 |
| Packed bulk Density (g/cc) |  | 1.01 | 1.03 | 1.00 | 1.00 |
| % Screen Analysis |  |  |  |  |  |
| Mesh | Microns |  |  |  |  |
| +20 | >850 | 0.16 | 0.17 | 0.18 | 0.21 |
| −20 to +50 | 850 to 300 | 98.55 | 98.67 | 98.51 | 98.08 |
| −50 | <300 | 1.39 | 1.19 | 1.29 | 1.33 |

Five grams of the granular hydrated calcium hypochlorite product having a known available chlorine concentration were placed on the surface of a tank of water four feet deep. No circulation or agitation was present during the initial dissolution period. The granular hydrated calcium hypochlorite particles passed Five grams of the commercial granular hydrated calcium hypochlorite of the above compositions were dispersed daily in the tank using the exact procedure of EXAMPLE 1 for the same time period. The average percent of commercial hydrated $Ca(OCl)_2$ particles which dissolved is shown in Table I below.

TABLE I

| | Hydrated $Ca(OCl)_2$ Particles Dissolved | | | |
|---|---|---|---|---|
| Example No. | % Particles Dissolved | Comparative Example | % Particles Dissolved | % Difference |
| 1 | 72.6 | A | 49.1 | 23.5 |
| 2 | 74.5 | B | 50.0 | 24.5 |
| 3 | 75.9 | C | 51.2 | 24.7 |
| 4 | 76.8 | D | 52.3 | 24.5 |

Using the improved granular hydrated calcium hypochlorite product of the present invention, there was an average increase in the solubility rate of at least 23 percent over that of the commercial granular hydrated calcium hypochlorite of the prior art.

What is claimed is:

1. A rapidly dissolving granular hydrated calcium hypochlorite product consisting essentially of hydrated calcium hypochlorite particles having at least 95 percent of said particles within a size range of from about 300 to about 850 microns and having a packed bulk density from about 0.90 to about 1.03 grams per cubic centimeter.

2. The granular hydrated calcium hypochlorite product of claim 1 in which the hydrated calcium hypochlorite particles have a water content of from about 5 to about 8 percent and an available chlorine content of from about 55 to about 75 percent.

3. The granular hydrated calcium hypochlorite product of claim 1 in which the particle size range is from about 325 to about 800 microns.

4. A rapidly dissolving calcium hypochlorite product, consisting essentially of granular hydrated calcium hypochlorite having an available chlorine concentration of from about 65 to about 72 percent, and having a packed bulk density from about 0.90 to about 1.03 grams per cubic centimeter and having a dissolving rate of about 70 weight percent or higher in one minute when dispersed on the surface of a body of water at least 3 feet deep, at least 95 percent of said particles having a size range of from about 300 to about 850 microns.

5. The granular hydrated calcium hypochlorite product of claim 4 having at least 97% of the particles within a size range of from about 300 to about 850 microns.

* * * * *